(12) United States Patent
Liao et al.

(10) Patent No.: US 11,524,280 B2
(45) Date of Patent: Dec. 13, 2022

(54) LOW-PLATINUM CATALYST BASED ON NITRIDE NANOPARTICLES AND PREPARATION METHOD THEREOF

(71) Applicant: SOUTH CHINA UNIVERSITY OF TECHNOLOGY, Guangdong (CN)

(72) Inventors: Shijun Liao, Guangdong (CN); Xinlong Tian, Guangdong (CN); Junming Luo, Guangdong (CN); Rong Chen, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 84 days.

(21) Appl. No.: 16/726,836

(22) Filed: Dec. 25, 2019

(65) Prior Publication Data
US 2020/0164350 A1    May 28, 2020

Related U.S. Application Data

(62) Division of application No. 15/739,755, filed as application No. PCT/CN2015/100018 on Dec. 30, 2015, now Pat. No. 10,549,266.

(30) Foreign Application Priority Data

Jun. 23, 2015   (CN) .......................... 201510348842.0

(51) Int. Cl.
| | | |
|---|---|---|
| *B01J 27/24* | (2006.01) | |
| *H01M 4/88* | (2006.01) | |
| *B01J 23/42* | (2006.01) | |
| *B01J 37/00* | (2006.01) | |
| *B01J 37/34* | (2006.01) | |
| *H01M 4/92* | (2006.01) | |

(Continued)

(52) U.S. Cl.
CPC ............... *B01J 27/24* (2013.01); *B01J 23/42* (2013.01); *B01J 37/0072* (2013.01);
(Continued)

(58) Field of Classification Search
CPC ........ B01J 27/24; B01J 23/42; B01J 37/0072; B01J 37/348; H01M 4/8853; H01M 4/926; B82Y 30/00; B82Y 40/00
(Continued)

(56) References Cited

U.S. PATENT DOCUMENTS 4,130,506 A * 12/1978 Collier ...................... B22F 1/02
106/403
4,163,736 A * 8/1979 Acres ....................... B01J 23/40
427/125

(Continued)

*Primary Examiner* — Patricia L. Hailey
(74) *Attorney, Agent, or Firm* — JCIPRNET (57) ABSTRACT

The present invention discloses a low-platinum catalyst based on nitride nanoparticles and a preparation method thereof. A component of an active metal of the catalyst directly clades on a surface of nitride particles or a surface of nitride particles loaded on a carbon support in an ultrathin atomic layer form. Preparation steps including: preparing a transition-metal ammonia complex first, nitriding the obtained ammonia complex solid under an atmosphere of ammonia gas to obtain nitride nanoparticles; loading the nitride nanoparticles on a surface of a working electrode, depositing an active component on a surface of the nitride nanoparticles by pulsed deposition, to obtain the low platinum loading catalyst using a nitride as a substrate. The catalyst may be used as an anode or a cathode catalyst of a low temperature fuel cell, has very high catalytic activity and stability, can greatly reduce a usage amount of a precious metal in the fuel cell, and greatly reduces a cost of the fuel cell. The present invention has important characteristics of being controllable in deposition amount, simple and convenient to operate, free of protection of inert atmosphere, and etc., and is suitable for large-scale industrial production.

12 Claims, 5 Drawing Sheets

(51) Int. Cl.
*B82Y 30/00* (2011.01)
*B82Y 40/00* (2011.01)

(52) U.S. Cl.
CPC ......... *B01J 37/348* (2013.01); *H01M 4/8853* (2013.01); *H01M 4/926* (2013.01); *B82Y 30/00* (2013.01); *B82Y 40/00* (2013.01)

(58) Field of Classification Search
USPC .................................. 502/101, 200; 205/104
See application file for complete search history.

(56) References Cited

U.S. PATENT DOCUMENTS

| | | | | |
|---|---|---|---|---|
| 4,724,052 A | * | 2/1988 | Nidola | C25B 11/091 205/109 |
| 5,326,735 A | * | 7/1994 | Itoh | B01J 27/22 502/177 |
| 7,354,354 B2 | * | 4/2008 | Palumbo | A01K 87/00 473/320 |
| 8,962,513 B2 | * | 2/2015 | Liu | C07F 9/3813 502/185 |
| 2002/0142094 A1 | * | 10/2002 | Fukushima | H01B 1/22 427/214 |
| 2004/0058224 A1 | * | 3/2004 | Eshraghi | H01M 4/921 429/465 |
| 2005/0176989 A1 | * | 8/2005 | Coleman | B01J 35/1028 562/11 |
| 2012/0175534 A1 | * | 7/2012 | Jung | B82Y 30/00 250/515.1 |
| 2014/0121097 A1 | * | 5/2014 | Phillips | H01M 4/925 502/177 |
| 2015/0105241 A1 | * | 4/2015 | Roman-Leshkov | H01M 4/583 502/177 |

\* cited by examiner

LOW-PLATINUM CATALYST BASED ON NITRIDE NANOPARTICLES AND PREPARATION METHOD THEREOF

CROSS-REFERENCE TO RELATED APPLICATION

This application is a divisional application of and claims the priority benefit of a prior application Ser. No. 15/739,755, filed on Dec. 25, 2017. The entirety of the above-mentioned patent application is hereby incorporated by reference herein and made a part of this specification.

TECHNICAL FIELD

The present invention relates to a field of fuel cells, and is a low-platinum catalyst based on nitride nanoparticles applicable to a fuel cell, and a preparation method thereof.

BACKGROUND

Energy shortages and environmental problems caused by burning large amounts of fossil fuels are aggravating, forcing people to pay more and more attention to exploring new sources of energy and new energy conversion technologies. A low temperature fuel cell, due to its advantages such as high energy conversion efficiency, quick start and non-polluting is known as a class of fuel cell having the most large-scale industrialization prospects. The low temperature fuel cell includes a proton exchange membrane fuel cell, a direct-methanol fuel cell and a direct-acid fuel cell, etc. Catalysts for these fuel cells all use precious metal platinum that is expensive and of scarcity as a main active component, and the resulting high cost of the fuel cell has become a key factor restricting the commercialization of the fuel cell. Meanwhile, as for a commercial Pt/C catalyst that is currently widely used, since only a weak absorption exists between loaded metal particles and a carbon support and the carbon support is easily corroded under an operating condition of the fuel cell, resulting in exfoliation and migration of active metal nanoparticles, seriously limiting a service life of the fuel cell. Therefore, preparation and study of a low-cost, high-activity and high-stability catalyst is of great significance for development and promotion of the fuel cell.

Transition metal nitrides have characteristics such as high melting point, high hardness, corrosion resistance and high electrical conductivity. At the same time, a large number of studies show that nitrides exhibit relatively high activity in some processes of hydrogenation reduction and oxygen reduction and are called "platinum-like catalyst". Chen et al. used carbon nitride as a hard template to synthesize carbon-supported titanium nitride particles and directly used titanium nitride to catalyze a redox reaction (Ji Chen, Kazuhiro Takanabe, Ryohji Ohnishi, et al. Chem. Commun., 2010, 46, 7492-7494). Although the carbon-supported titanium nitride particles prepared by this technique show certain oxygen reduction activity, its activity is still far away from practical application.

DiSalvo et al. first treated a mixture of zinc oxide and titanium dioxide at 1350° C. for 3 hours, and a sample was taken after cooling and ammonia gas was introduced at 800-900° C. to obtain titanium nitride particles having a particle size of 25-45 nm. By using the titanium nitride particles instead of a catalyst prepared by carbon powder supporting Pt, it was found to have better methanol oxidation performance and stability than the commercial Pt/C catalyst (Minghui Yang, Zhimin Cui and Francis J. DiSalvo, Phys. Chem. Chem. Phys., 2013, 15, 1088). Meanwhile, this research group made use of the same synthesis method to obtain chromium nitride particles with a particle size of 30-50 nm. The Pt catalyst supported by chromium nitride particles showed higher stability than the conventional Pt/C catalyst, and at the same time, an oxygen reduction activity and a methanol oxidation activity were 1.8 times and 1.4 times that of the Pt/C, respectively (Minghui Yang, Rohiverth Guarecuco, and Francis J. DiSalvo, Chem. Mater., 2013, 25, 1783-1787; Minghui Yang, Zhimin g Cui and Franc is J. DiSalvo, Phys. Chem. Chem. Phys., 2013, 15, 7041). However, this method has high requirements on equipment, preparation of samples requires extremely high temperature, and energy consumption is high, while a loading amount of Pt fails to be effectively reduced.

Thotiyl et al. first deposited a layer of titanium nitride on a stainless steel wire by cathodic arc deposition technique to prepare a working electrode, then deposited Pd or Pt metal by a DC deposition method, and thereby prepared a Pt or Pd catalyst supported by the titanium nitride. In an ethanol oxidation experiment, this catalyst showed better catalytic activity and stability than the Pt/C (M.M.O. Thotiyl, T. Ravi Kumar, and S. Sampath, J. Phys. Chem. C, 2010, 114, 17934-17941; M.M.O. Thotiyl, S. Sampath, Electrochim. Acta, 2011, 56, 3549-3554). A method for preparing the catalyst is complicated, an average particle size of the precious metal prepared is 200 nm, and amplitude of increase of activity per unit mass of platinum of the catalyst is very limited.

Chinese patent application No. 200610027287 discloses a preparation technique of an anti-corrosion fuel cell catalyst, wherein Pt was supported on a surface of nitride-supported metal oxide by hydrolysis or vapor-phase thermal decomposition, but morphology of the prepared catalyst and performances of the catalyst are not clearly described and provided with relevant proof materials.

In summary, although there have been many efforts to utilize a nitride directly as a fuel cell catalyst and as a carrier for the fuel cell catalyst, one or more disadvantages remain. In the prior art, a related report that a pulse electrodeposition method is used to directly deposit a thin active metal layer on a surface of inexpensive transition-metal nitride nanoparticles to prepare a catalyst suitable for fuel cell with a particle size within 10 nm has not been found.

SUMMARY OF THE INVENTION

The present invention discloses a low-platinum catalyst based on nitride nanoparticles for a fuel cell and a pulse electrodeposition preparation method thereof. The novel catalyst may be used for a proton exchange membrane fuel cell and other processes that require a precious metal catalyst. For current deficiencies such as high loading amount of Pt, complicated preparation technique of the low-platinum catalyst and easy corrosion of a carbon support, it is provided a method of efficiently and inexpensively preparing a high-performance and high-stability low-platinum loading catalyst.

A non-aqueous ammonia gas complexation method is used for first synthesizing transition-metal ammonia complex nanoparticles, then preparing transition-metal nitride nanoparticles by means of high temperature nitriding; using a salt solution of an active metal as an electrodeposition precursor, by a method pf constant current pulse electrodeposition, using different $T_{on}/T_{off}$ values (0.1-100), uniformly depositing the active metal with an atomic layer level thickness on a surface of the transition-metal nitride nanoparticles, to obtain the low-platinum catalyst having high activity and high stability.

An active component of the catalyst is the nitride nanoparticles cladded with a platinum atomic layer, the active metal directly cladding on the surface of the nitride nanoparticles or the surface of the nitride nanoparticles supported on the carbon support in an ultrathin atomic layer form. The catalyst uses a transition metal nitride or a carbon-supported transition metal nitride as a substrate, and uses one or more of Pt, Ir, Pd, Ru or Au element as a covering layer. The preparation method includes: preparing the transition metal nitride or the carbon-supported transition metal nitride that serves as a substrate material, fabricating a working electrode for pulse electrodeposition, and finally obtaining the catalyst by means of pulse electrodeposition. The catalyst may be used as an anode or a cathode catalyst of a low temperature fuel cell, and the catalyst has advantages of high activity and good stability. The preparation technique has advantages such as easy operation, free of protection of inert atmosphere, and controllable amount of deposition, and is suitable for large-scale production. The catalyst may significantly decrease a precious metal usage amount of the fuel cell, greatly reduces the cost of the fuel cell, and has great significance for accelerating a commercialization process of the fuel cell.

A preparation method of the low-platinum catalyst based on nitride nanoparticles, includes several steps as follows:

(1) a preparation of the nitride nanoparticles: dissolving one or more transition metal salts in a non-aqueous solvent, then introducing ammonia gas for 0.5-1 hour, evaporating the solvent at 50-90° C. in a vacuum drying oven to obtain a transition-metal ammonia complex; high temperature nitriding the transition-metal ammonia complex in ammonia gas atmosphere for 3-5 hours to prepare transition-metal nitride nanoparticles; the transition-metal ammonia complex includes an ammonia complex formed by any one or a binary or ternary ammonia complex formed by two or more of Ti, V, Cr, Mn, Fe, Co, Ni, Cu, Nb, Mo or Ta; a temperature of the high temperature nitriding is 500-900° C.; the prepared transition-metal nitride nanoparticle has a diameter of 5-15 nm; the non-aqueous solvent is alcohols, or a mixture formed by the alcohols with a ketone or an ester; the transition metal salt includes titanium tetrachloride, tetrabutyl titanate, chromium acetate, manganese chloride, ferric nitrate, cobaltous acetate, copper chloride, niobium chloride, molybdenum chloride and tantalum chloride; and a preparation of carbon-supported transition-metal nitride nanoparticles: except that the transition metal salts and a pretreated carbon support are added into the solvent simultaneously, other steps are the same as the preparation of the nitride nanoparticles; the carbon support includes an XC-72R carbon black, a carbon nanotube, a carbon nanofiber or graphene; a loading amount of the nitride nanoparticles on the carbon support is 10 wt %-40 wt %;

(2) a fabrication of a working electrode for a pulse electrodeposition, utilizing a method a or a method b as follows:

the method a: weighing an appropriate amount of the nitride nanoparticles or the carbon-supported transition-metal nitride nanoparticles to add into 1-5 mL of an alcoholic solution containing an adhesive, ultrasonically dispersing to make into a slurry, using a micropipette to take an appropriate amount of the slurry to uniformly coat a surface of a working electrode substrate used, a final loading amount of a substrate material is 0.1-0.5 mg/cm2, and the working electrode for the pulse electrodeposition is obtained after drying; the adhesive includes a polytetrafluoroethylene emulsion, a fluorocarbon resin emulsion or a perfluorosulfonate resin emulsion, a mass percent of a usage amount of the adhesive accounts for 0.5%-20% of a total amount of the catalyst substrate material based on a dry polymer resin; the alcohols include ethanol, isopropanol or ethylene glycol; the working electrode substrate includes a glassy carbon, a nickel foam, a titanium sheet, a platinum plated titanium sheet or a platinum sheet; and a way of the drying includes drying by natural air-drying, radiation drying under infrared light or drying by putting into an oven; and the method b: directly adding the nitride nanoparticles or the carbon-supported transition-metal nitride nanoparticles that are used as the substrate material into a cathode electrolyte solution containing a required active metal for the pulse electrodeposition, stirring, forming the working electrode by a continuous contact of the particles with a cathode conductor; and a catholyte and an anolyte are isolated using a microporous medium; and (3) the pulse electrodeposition: placing the fabricated working electrode into 0.1-0.5 M $H_2SO_4$ solution saturated with nitrogen, scanning from an open-circuit voltage to −0.25~0 V at a scan speed of 5-50 mV/s, with a number of scanning laps of 10-50 laps, achieving cleanness and an activating treatment of the substrate material; then transferring the electrode into a nitrogen saturated electrodepositing solution containing a salt of the required active metal, a complexing agent (or stabilizer) and a conductive aid under an atmosphere of nitrogen, connecting an auxiliary electrode with a reference electrode; setting a pulse frequency, a number of times of pulse deposition, a conduction time and a disconnection time, then opening a pulse electrodeposition program, washing the catalyst from the surface of the electrode when the electrodeposition is completed to obtain the low-platinum catalyst based on the nitride nanoparticles.

In the above-described preparation method, specific method for pretreatment of the carbon support is as follows: weighing 5-20 g of the carbon support, adding into a 200-1000 mL beaker, injecting acetone of ⅗ volume of the beaker, stirring at room temperature for 2-12 hours, filtering, washing, then vacuum drying at 50-80° C.; calcining the dried carbon support at 200-500° C. under an atmosphere of high purity argon for 2-3 hours, then heating and refluxing in a mixed solution of $HNO_3$ and $H_2SO_4$ (a molar ratio is 1:1-1:5, and a solution concentration is 2-5 mol/L) for 6-10 hours, keeping a temperature at 70-80° C., after finally filtering the carbon support and washing the carbon support to neutral with double-distilled water, vacuum drying in the oven at 50-90° C. for 8-24 hours to obtain the pretreated carbon support.

In the above-described preparation method, a specific preparation method of the transition-metal ammonia complex in a non-aqueous solution is as follows: adding a transition metal precursor into a beaker containing the non-aqueous solvent, transferring into a Meng washing bottle after dissolving of the transition metal precursor is completed, introducing ammonia gas for complexation, with a gas flow of ammonia gas being controlled as 30-100 ml/min, and an introducing time of 0.5-1 hour; transferring an obtained mixture containing a complex into a crucible, vacuum drying in the oven at 50-90° C. for 8-24 hours to obtain a nitride ammonia complex; wherein the precursor includes one or two or three of titanium tetrachloride, iron acetate, cobalt acetate, nickel acetate, vanadium chloride, chromic acetate, manganese chloride and niobium chloride; and a concentration range of the precursor in a reaction system solution is 0.1-3 mg/mL.

In the above-described preparation method, a component of the active metal contained in the electrodepositing solution in the step (3) includes: one or more of Pt, Au, Pd, Ru and Ir; a salt of the active metal includes one or more of tetraammineplatinum chloride monohydrate, chloroplatinic acid, chloroauric acid, palladium dichloride, ruthenium trichloride and iridous chloride; the complexing agent includes citric acid, EDTA or polyvinylpyrrolidone; the conductive aid is sodium sulfate or potassium sulfate; and a concentration of the component of the active metal is 5-100 mM.

In the above-described preparation method, a way of deposition of the active metal in the step (3) is the pulse electrodeposition, the pulse frequency is 100-10000 s-1, each pulse contains a turn-on time and a turn-off time, the turn-on time (ton) is 0.00003 s to 0.001 s, the turn-off time (toff) is 0.00015-0.01 s, a ratio of the turn-on time to the turn-off time (ton/toff) varies depending on a molar concentration of the active metal in an electrolyte and the loading amount of the active metal required, with a value between 0.1 and 100; and a total pulse number is 500-20000.

In the above-described preparation method, a pulse current density of the pulse electrodeposition in the step (3) is 1-50 mA/cm2.

In the above-described preparation method, an active component of the prepared catalyst is the transition-metal nitride nanoparticles with an atomic layer cladding of an active metal, the active metal cladding on a surface of a transition metal nitride served as a substrate or of transition-metal nitride nanoparticles supported on a carbon support in an ultrathin atomic layer form; wherein the transition metal nitride served as the substrate includes a unary, a binary or a ternary transition metal nitride, an average particle size of the nanoparticles being 5-15 nm. The active metal used for deposition includes one or an alloy formed by two or more of Pt, Ir, Pd, Ru or Au. The carbon support includes a carbon black particle, a carbon nanotube fiber, a carbon nanotube or graphene. A mass composition of the catalyst is as follows: the carbon support is 50%-80%; the transition metal nitride is 10%-40%, and the component of the active metal is 4%-10%.

In the above-described preparation method, the ultrathin atomic layer is composed of 1-5 atomic layers; and the transition metal nitride includes binary and ternary transition metal nitrides consisting of one or two or more of Ti, V, Cr, Mn, Fe, Co, Ni, Cu, Nb, Mo or Ta.

In the above-described preparation method, the catalyst shows good activity for a cathodic oxygen reduction, a methanol oxidation and a formic acid oxidation reaction, and can be used as anode and cathode catalysts for a hydrogen-oxygen fuel cell, a direct methanol fuel cell and a direct formic acid fuel cell. Its precious metal usage amount is 4-5 times less than that of a commercial Pt/C catalyst, while its mass activity and specific activity can be increased by 3-10 times compared with that of the commercial Pt/C catalyst. In addition, the catalyst is also applicable to a hydrogenation catalyst in chemical industry.

The preparation technique of the present invention can also directly use commercially available nitrides, carbides, oxides, sulfides, phosphides, etc. as substrates for supporting active metals.

Compared with the prior art, the low-platinum catalyst based on nitride nanoparticles and the preparation method thereof according to the present invention have following advantages:

(1) the present invention proposes a preparation method of preparing small particle size nitride nanoparticles with controllable particle size, and the prepared nitride nanoparticles have a particle size of less than 10 nm, making it suitable for preparing the fuel cell catalyst;

(2) compared with the usual carbon support, nitrides have better stability for electrochemical corrosion resistance; it can effectively solve the problem that a carbon corrosion of the traditional carbon-supported catalyst leads to an activity decay of the fuel cell;

(3) the present invention utilizing the pulse electrodeposition technique, may realize an atomic layer level deposition (which is usually a thickness of 3-5 atomic layers) of the active component on the surface of the nitride nanoparticles; compared with a traditional core-shell structure catalyst, it is unnecessary to use a precious metal or an alloy of the precious metal as a core of the core-shell structure, ensuring the high performance of the active component while effectively reducing the cost of the catalyst;

(4) compared with the conventional under-potential deposition technique for preparing the core-shell structure catalyst, the activity of the catalyst prepared by the pulse electrodeposition technique proposed by the present invention is comparable to that of the catalyst prepared by the under-potential deposition; meanwhile, the pulse electrodeposition technique has a controllable depositing amount, and is simple, free of protection of inert gas; and industrial production and application are easy to achieve; and (5) the catalyst prepared by the present invention has relatively high catalytic performance for the methanol oxidation, the anodic oxidation of formic acid and the cathodic reduction reaction of oxygen, the activity per unit mass of platinum is 2-10 times that of the commercial Pt/C catalyst, and simultaneously the catalyst has extremely high stability.

DETAILED DESCRIPTION OF THE PREFERRED EMBODIMENT

The present invention is further described below in combination with accompanying drawing and embodiments. The embodiments below are just for illustrating the present invention more clearly, but the scope of protection claimed by the present invention is not limited to the scope expressed by the below embodiments, and solutions and effects described in the content of the present invention all can be realized with reference to examples as follows.

Embodiment 1: Pt@TiN Catalyst (1) Preparation of TiN Nanoparticles Used as a Substrate In a fuming hood, 60 mL of absolute anhydrous ethanol was added into a Meng washing bottle, and then 2 mL of $TiCl_4$ was added. After uniformly shocked (stirred), dry ammonia gas was introduced until a number of a formed precipitate did not increase and there were ammonia gas bubbles; ammonia gas was interrupted, the washing bottle was transferred into a vacuum drying oven after the washing bottle was covered, the bottle was uncovered, and was vacuum dried in the oven at 70° C. for solvent evaporation for 16 hours to obtain a titanium ammonia complex solid;

3 g of the complex solid was taken and put into a quartz boat, and the quartz boat was put into a quartz tube furnace, air in a high purity nitrogen replacement furnace tube was introduced first, and then ammonia water was introduced and a temperature began to increase; a flow rate of the ammonia water was controlled at 10 ml/min, and a heating rate was 5° C./min; the temperature was increased to 750° C., then constant temperature nitriding was performed at this temperature for two hours, and then it was switched to high purity nitrogen gas and the temperature began to decrease, it was taken out after cooled to room temperature, measured by XRD, and the obtained product was pure TiN with a cubic structure (card number: JCPDS NO. 38-1420).

(2) Preparing Pt@TiN by a Constant Current Pulse Method 5 mg of TiN was added into an 1 mL ethanol solution containing 0.25 wt % of a perfluorinated sulfonic acid resin (Nafion), after an ultrasound for 15 minutes into an ink-form slurry, 5 uL of the slurry was taken and was uniformly coated on a glassy carbon electrode served as a working electrode, and was dried naturally. An amount of TiN on the electrode was 75 µg/cm$^{-2}$, the working electrode was placed in a 0.5 M $H_2SO_4$ solution saturated with nitrogen, and was scanned from an open-circuit voltage to −0.2 V for 20 laps at a scan speed of 50 mV/s, to remove a contaminant on a surface of the nitride nanoparticle. The working electrode was then transferred into a chloroplatinic acid salt solution saturated with nitrogen (chloroplatinic acid hexahydrate, with a concentration of 50 mM, containing 0.1 M sodium sulfate and 50 mM polyvinylpyrrolidone), a platinum wire and an Ag/AgCl electrode were served as a counter electrode and a reference electrode, respectively, according to a preset constant current pulse deposition program (a peak current density was 5 mA/cm$^2$, a turn-on time was 3 ms, a turn-off time was 15 ms, a pulse number was 5200, and an electrodeposition temperature was room temperature), to obtain Pt@TiN catalyst.

Actual compositions of the catalyst can be determined by Inductively Coupled Plasma Atomic Emission Spectroscopy (ICP-OES). A specific method was as followed: the catalyst was eluted from the surface of the electrode by ethanol, then aqua regia was added for dissolving, its concentration was determined by ICP-OES spectroscopy, and a mass composition of the catalyst was finally obtained by conversion, and the actual loading amount of Pt was determined.

(3) Structure and Morphology Characterization and Performance Testing of the Catalyst.

Figure 1:
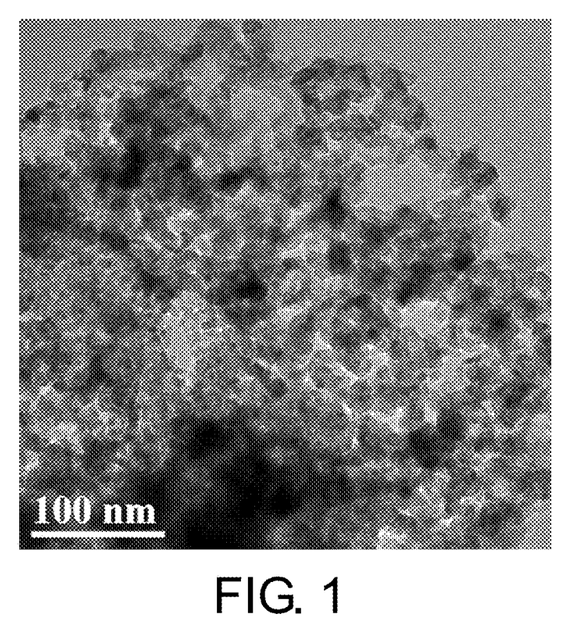
FIG. 1 is a TEM image of titanium nitride prepared in Embodiment 1.
Figure 2:
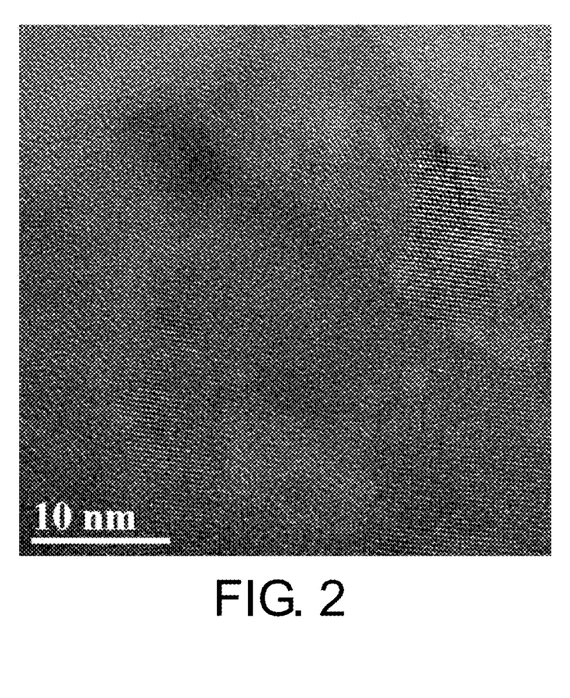
FIG. 2 is a TEM image of Pt@TiN prepared in Embodiment 1.

(A) Structure and Morphology Characterization of the Catalyst:

Morphology of the nitride nanoparticles and morphology of the nitride nanoparticles supporting platinum were observed by transmission electron microscopy (TEM) (FIG. 1), and an average particle size of the titanium nitride prepared in the present embodiment was 8-11 nm, with a relatively uniform particle size distribution. It can be seen from FIG. 2 that, platinum deposited by the pulse electrodeposition method did not form particles at the surface of titanium nitride, while lattice fringes of Pt and titanium nitride can be clearly seen by a high resolution transmission electron microscopy image, and there were also significant differences between the two fringes, proving that Pt was deposited with an atomic layer level thickness. The result of the ICP analysis shows that the catalyst prepared in the present embodiment has a platinum loading of 5.3%.

Figure 3:
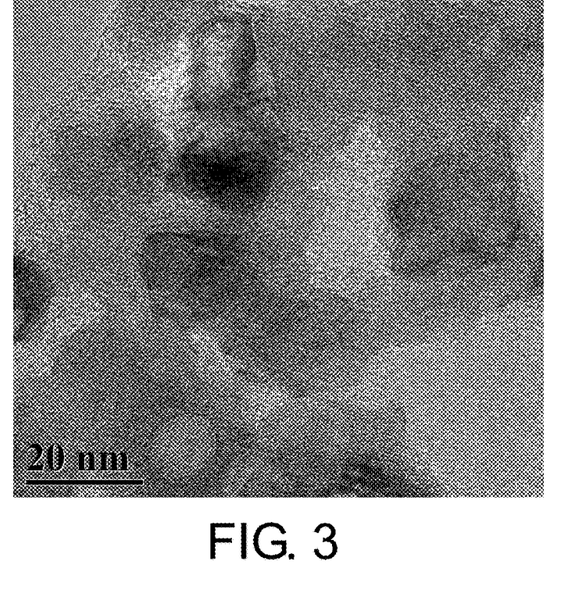
FIG. 3 is transmission electron microscopy (TEM) and high resolution transmission electron microscopy (HR-TEM) images of Pt@TiNiN prepared in Embodiment 2.

(B) Cathodic Oxygen Reduction Catalytic Performance Test:

Cyclic voltammetry was performed using a three-electrode system in 0.1 M $HClO_4$ saturated with oxygen at a scan speed of 10 mV/s and an electrode speed of 1600 r/min. The results are shown in FIG. 3.

Figure 6:
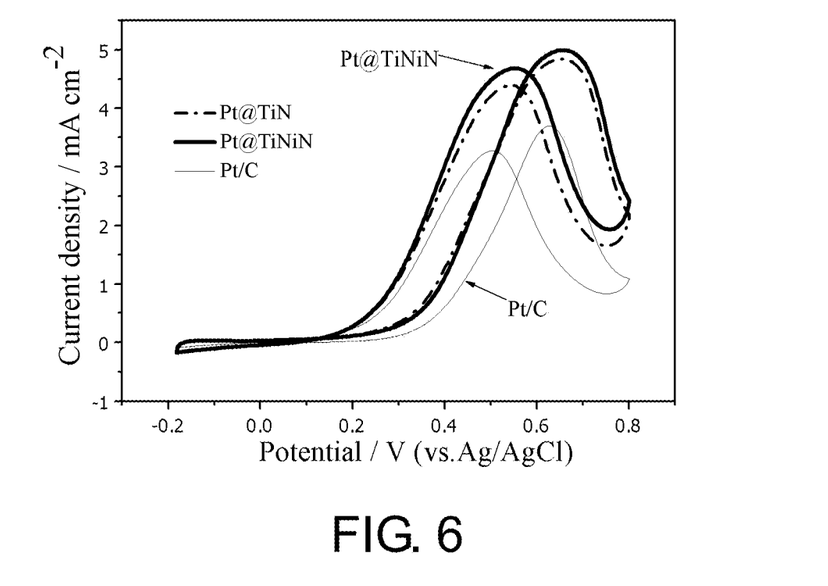
FIG. 6 is a curve chart of performances of Embodiment 1, Embodiment 2 and a commercial Pt/C for methanol oxidation.

(C) Methanol Anodic Oxidation Catalytic Performance Test:

Cyclic voltammetry was performed using the three-electrode system in a 0.5 M $H_2SO_4$+1 M $CH_3OH$ solution at a scan speed of 50 mV/s. The catalytic activity of the catalyst for methanol anodic oxidation was measured. The results are shown in FIG. 6.

Figure 7:
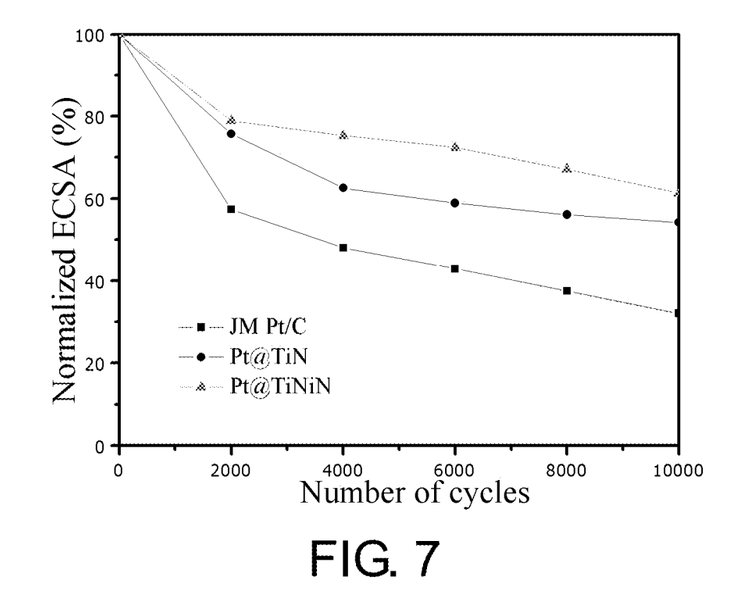
FIG. 7 is a comparison chart of change in electrochemically active surface area (ECSA) of Embodiment 1, Embodiment 2 and a commercial Pt/C, cyclically scanned at room temperature in 0.5 M $H_2SO_4$.
Figure 8:
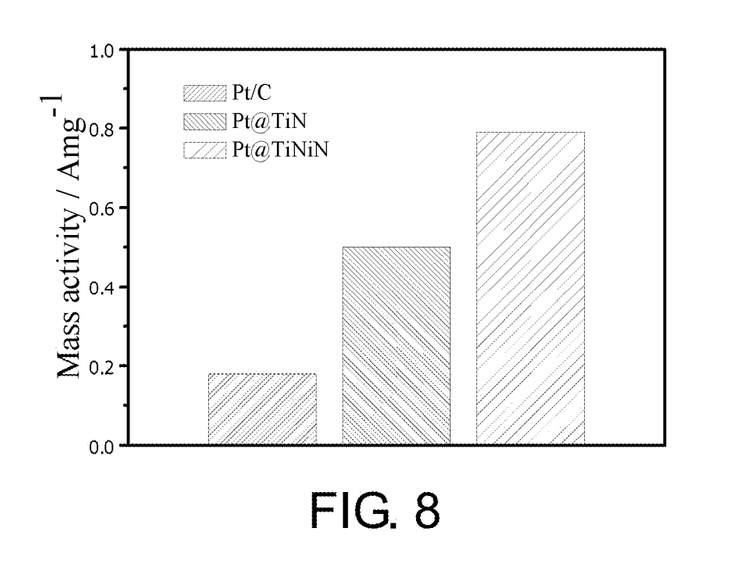
FIG. 8 is a histogram comparing methanol oxidation performances of Embodiment 1, Embodiment 2 and a commercial Pt/C.
Figure 9:
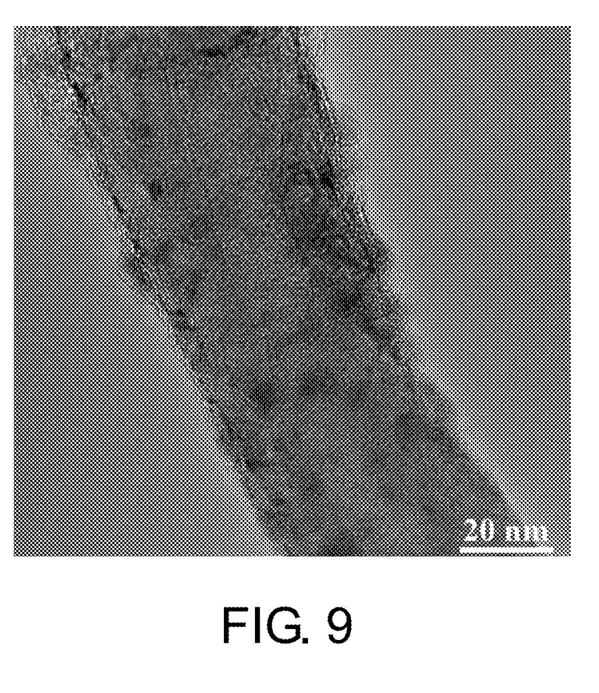
FIG. 9 is a (TEM) image of carbon nanotubes-supported titanium nitride (TiN/CNTs) synthesized in Embodiment 3.

(D) Catalyst Stability Performance Test:

Cyclic voltammetry was performed using the three-electrode system in a 0.5 M $H_2SO_4$ solution with a scan speed of 50 mV/s and a scan range of 0.3-0.75 V (0.6-1.05 Vs RHE), and a change in electrochemically active surface area (ECSA) was recorded every 2000 laps of scanning. The specific operation was to scan at a scan speed of 50 mV/s with a scan range of −0.2-1.0V, the operation was stopped after the curve was stable, and a scan curve was recorded. The scan range was then resealed to 0.3-0.75V (0.6-1.05 Vs RHE) for the next 2000 cycles of scanning. The change in electrochemically active surface area of the catalyst is shown in FIG. 7.

Activities of the catalyst prepared in the present embodiment for oxygen reduction and methanol oxidation (activity per unit mass of platinum) were 2.8 times and 1.7 times that of the commercial Pt/C catalyst, respectively.

Unless otherwise stated, test methods involved in the present invention of the catalyst for cathodic oxygen reduction, anodic methanol oxidation, and catalyst stability are all the same as the above test methods.

Embodiment 2: Pt@TiNiN Catalyst (1) Preparation of a bi-metal nickel titanium nitride (TiNiN): in the fuming hood, 60 mL of ethanol was added into the Meng washing bottle, then 2 mL of TiCl4 solution and 169.7 mg of nickel acetate tetrahydrate were added and stirred to dissolve sufficiently. An atomic ratio of Ti to Ni was 19:1. Other preparation procedures were the same as Embodiment 1.

(2) Pt@TiNiN was prepared by the constant current pulse method as same as Embodiment 1.

(3) Structure and morphology of the catalyst are shown in FIG. 3.

Figure 4:
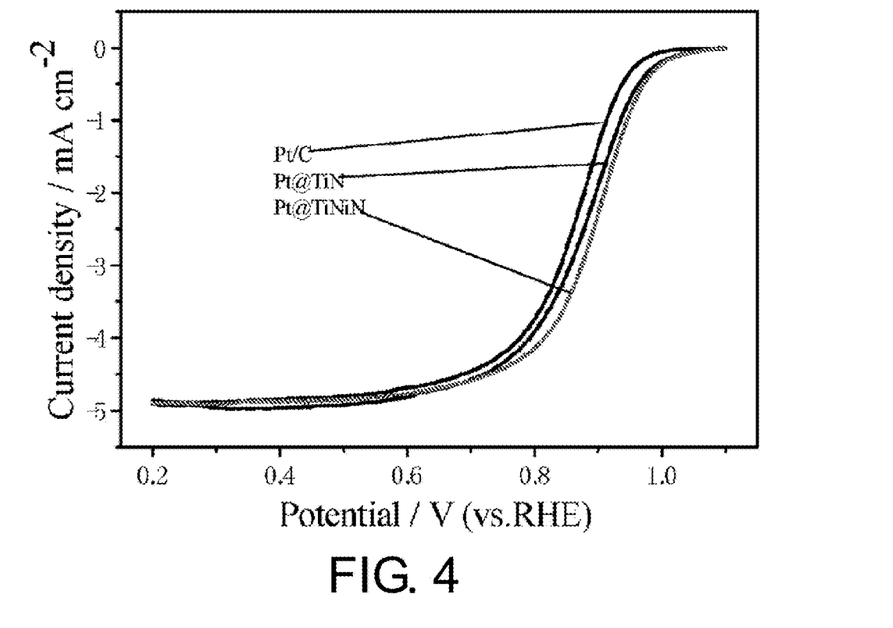
FIG. 4 is polarization curves of oxygen reduction of Embodiment 1, Embodiment 2 and a commercial Pt/C catalyst in the case of a same Pt loading amount.
Figure 5:
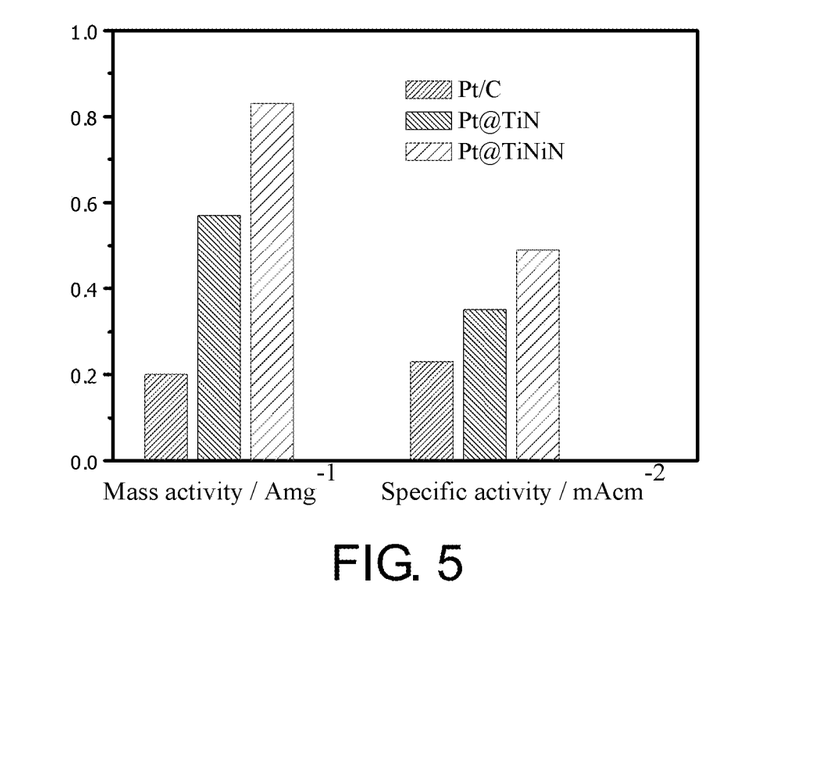
FIG. 5 is a histogram comparing mass activities of Embodiment 1, Embodiment 2 and a commercial Pt/C for oxygen reduction catalysis.

(4) Oxygen reduction performance test and methanol oxidation performance test of the catalyst are shown in FIG. 4 and FIG. 6, respectively (an abscissa is potential, and an ordinate is current density).

(5) Catalyst stability test is shown in FIG. 7.

Oxygen reduction performance and methanol oxidation performance of the catalyst prepared in the present embodiment were 4 times and 3.3 times that of the commercial Pt/C catalyst.

Embodiment 3: Pt@TiCoN Catalyst

Except that cobaltous acetate tetrahydrate was used instead of nickel acetate tetrahydrate, the other preparation methods and testing methods were completely the same as those of Embodiment 2, and the oxygen reduction performance of the catalyst prepared in the present embodiment was 3.3 times that of the commercial Pt/C catalyst.

Embodiment 4: Pt@TiMoN Catalyst

Except that molybdenum pentachloride was used instead of nickel acetate tetrahydrate, the other preparation methods and testing methods were completely the same as those of Embodiment 2, and the oxygen reduction performance of the catalyst was 3.1 times that of the commercial Pt/C catalyst.

Embodiment 5: Pt@TiN/CNTs Catalyst (1) Preparation of TiN/CNTs used as a substrate In a fuming hood, 60 mL of ethanol was added into a Meng washing bottle, 1 mL of $TiCl_4$ solution and 3.5 g of carbon nanotubes were added, and then they were stirred to be well blended. A carbon support accounted for 80% of a mass ratio of the substrate. Other processes were the same as Embodiment 1.

(2) Pt@TiN/CNTs was prepared by the constant current pulse method: the same as Embodiment 1 except for several differences as follows:

(A) the salt solution of the active metal (tetraammineplatinum chloride monohydrate, with a concentration of 5 mM, containing 0.1 M sodium sulfate and 0.125 M sodium citrate);

(B) the pulse current was 10 $mA/cm^2$, the turn-on time was 0.3 ms, and the turn-off time was 1.5 ms, and the oxygen reduction performance of the catalyst prepared in the present embodiment was 3.7 times that of the commercial Pt/C catalyst.

Embodiment 6: Pt@TiCrN/G Catalyst

The same as Embodiment 2 except for several differences as follows:

1. (1) Chromic chloride hexahydrate was used instead of nickel acetate tetrahydrate.

(2) Graphene was added into the mixed solution, and graphene accounted for 80% of a total mass ratio of the substrate.

(3) Pt@TiCrN/CNTs was prepared by the constant current pulse method as same as Embodiment 1, and the oxygen reduction performance of the catalyst prepared in the present embodiment was 2.9 times that of the commercial Pt/C catalyst.

Embodiment 7: Pd@TiN Catalyst

The same as Embodiment 1 except for one difference as follows:

(1) Pd@TiN was prepared by the constant current pulse method:

the chloroplatinic acid solution was replaced by a palladium dichloride solution, and a concentration of the metal particles was 100 mM, containing 0.2 M sodium sulfate and 0.05 M polyvinylpyrrolidone, and Pd@TiN catalyst was then continued to be prepared by the constant current pulse method.

The methanol oxidation performance of the catalyst prepared in the present embodiment was 2.5 times that of the commercial Pt/C catalyst.

Embodiment 8: Pd@NbN/CNTs Catalyst

The same as Embodiment 5 except for several differences as follows:

(1) Preparation of NbN/CNTs used as a substrate: columbium pentachloride was used instead of titanium tetrachloride as the metal precursor.

(2) After the tube furnace was cooled to room temperature, NbN/CNTs was not taken out immediately, an exhaust port of the tube furnace was pluck off first, and nitrogen gas was continued to be introduced close to a gas valve side to make NbN/CNTs slowly contact the air and to avoid niobium nitride from being oxidized. After nitrogen gas was continuously introduced for half an hour, the sample was taken out.

(3) The salt solution of the active metal was palladium dichloride, with a concentration of 50 mM, containing 0.1 M sodium sulfate and 0.05 M polyvinylpyrrolidone.

The methanol oxidation performance of the catalyst prepared in the present embodiment was 2.6 times that of the commercial Pt/C catalyst.

Embodiment 9: Ru@TiN Catalyst

The same as Embodiment 1 except for several differences as follows:

(1) The deposited active metal solution was replaced by a ruthenium trichloride solution.

(2) The polytetrafluoroethylene emulsion was replaced by a perfluorinated sulfonic acid resin as the adhesive, ethanol was replaced by isopropanol as the solvent, and a concentration of the resin was changed as 0.15%.

The methanol oxidation performance of the catalyst prepared in the present embodiment was 1.9 times that of the commercial Pt/C catalyst.

Embodiment 10: PtRu@TiN Catalyst

The same as Embodiment 1 except for one difference as follows:

(1) PtRu@TiN was Prepared by the Constant Current Pulse Method:

Electrodeposition of the active metal was implemented by two steps: Ru@TiN was prepared by the constant current pulse method first, and a specific implementation was the same as electrodepositing a shell-layer metal Pt part of Embodiment 1 (except a electroplate liquid was replaced by a ruthenium trichloride solution, with a concentration of 50 mM, containing 0.1 M sodium sulfate and 0.05 M polyvinylpyrrolidone), PtRu@TiN was then continued to be prepared by the constant current pulse method, and a specific implementation was the same as electrodepositing a shell-layer metal Pt part of Embodiment 1.

The oxygen reduction performance and the methanol oxidation performance of the catalyst prepared in the present embodiment were 4.2 times and 3.1 times that of the commercial Pt/C catalyst, respectively.

Embodiment 11: Pd@TiN/G Catalyst

The same as Embodiment 1 except for two differences as follows:

(1) preparation of TiN/G used as a substrate

In a fuming hood, 60 mL of ethanol was added into a Meng washing bottle, 1 mL of $TiCl_4$ solution was then injected into the ethanol solution slowly, and then 200 mg of graphene was added into the mixed solution, and they were stirred and blended sufficiently.

(2) Pd@TiN/G was prepared by the constant current pulse method:

the electroplate liquid was changed as the palladium dichloride solution replacing the chloroplatinic acid solution, with a concentration of 100 mM, containing 0.1 M sodium sulfate and 0.1 M polyvinylpyrrolidone.

The methanol oxidation performance of the catalyst prepared in the present embodiment was 2.9 times that of the commercial Pt/C catalyst.

As can be seen from the above data, the low-platinum catalyst based on nitride nanoparticles prepared by the pulse electrodeposition method has better catalytic activity and stability than the commercial Pt/C both in the methanol oxidation activity of the anode and the oxygen reduction activity of the cathode.

Any equivalent variation of the implementation used for the technical solution of the present invention by those having ordinary skill in the art by reading the specification of the present invention is covered by the right of the present invention.

What is claimed is:

1. A low-platinum catalyst based on transition-metal nitride nanoparticles, comprising:

an active component, wherein the active component of the catalyst is transition-metal nitride nanoparticles with an atomic layer cladding of an active metal, and the active metal cladding on a surface of a transition metal nitride serves as a substrate in an ultrathin atomic layer form; wherein the transition metal nitride serves as the substrate and comprises a unary, a binary or a ternary transition metal nitride, an average particle size of the nanoparticles being 5-15 nm; and a mass composition of the catalyst is as follows: the transition metal nitride is 10%-40%, and a component of the active metal is 4%-10%, wherein the low-platinum catalyst based on transition-metal nitride nanoparticles is prepared by the following steps:

(1) a preparation of the transition-metal nitride nanoparticles: dissolving one or more transition metal compounds in a non-aqueous solvent, then introducing ammonia gas for 0.5-1 hour, evaporating the solvent at 50-90° C. in a vacuum drying oven to obtain a transition-metal ammonia complex; high temperature nitriding the transition-metal ammonia complex in ammonia gas atmosphere for 3-5 hours to prepare transition-metal nitride nanoparticles; the transition-metal ammonia complex includes an ammonia complex formed by any one of Ti, V, Cr, Mn, Fe, Co, Ni, Cu, Nb, Mo or Ta, or a binary or ternary ammonia complex formed by two or more of Ti, V, Cr, Mn, Fe, Co, Ni, Cu, Nb, Mo or Ta; a temperature of the high temperature nitriding is 500-900° C.; the prepared transition-metal nitride nanoparticle has a diameter of 5-15 nm; the non-aqueous solvent is an alcohol, or a mixture formed by the alcohol with a ketone or an ester; the transition metal compound comprises titanium tetrachloride, tetrabutyl titanate, chromium acetate, manganese chloride, ferric nitrate, cobaltous acetate, copper chloride, niobium chloride, molybdenum chloride or tantalum chloride;

(2) a fabrication of a working electrode for a pulse electrodeposition, utilizing a method A or a method B as follows:

the method A: weighing an appropriate amount of the transition-metal nitride nanoparticles to add into 1-5 mL of an alcoholic solution containing an adhesive, ultrasonically dispersing to make into a slurry, using a micropipette to take an appropriate amount of the slurry to uniformly coat a surface of a working electrode substrate used, a final loading amount of a catalyst substrate material is 0.1-0.5 mg/cm2, and the working electrode for the pulse electrodeposition is obtained after drying; the adhesive comprises a polytetrafluoroethylene emulsion, a fluorocarbon resin emulsion or a perfluorosulfonate resin emulsion, a mass percent of a usage amount of the adhesive accounts for 0.5%-20% of a total amount of the catalyst substrate material based on a dry polymer resin; the alcoholic solution comprises ethanol, isopropanol or ethylene glycol; the working electrode substrate comprises a glassy carbon, a nickel foam, a titanium sheet, a platinum plated titanium sheet or a platinum sheet; and the drying comprises drying by natural air-drying, radiation drying under infrared light or drying by putting into an oven; or the method B: directly adding the transition-metal nitride nanoparticles that are used as the substrate material into a cathode electrolyte solution containing a required active metal for the pulse electrodeposition, stirring, forming the working electrode by a continuous contact of the particles with a cathode conductor; and a catholyte and an anolyte are isolated using a microporous medium; and (3) the pulse electrodeposition: placing the fabricated working electrode into 0.1-0.5 M $H_2SO_4$ solution saturated with nitrogen, scanning from an open-circuit voltage to −0.25-0 V at a scan speed of 5-50 mV/s, with a number of scanning laps of 10-50 laps, achieving cleanness and an activating treatment of the substrate material; then transferring the electrode into a nitrogen saturated electrodepositing solution containing a salt of the required active metal, a complexing agent and a conductive aid under an atmosphere of nitrogen, connecting an auxiliary electrode with a reference electrode;

setting a pulse frequency, a number of times of pulse deposition, a conduction time and a disconnection time, then opening a pulse electrodeposition program, washing the catalyst out from the surface of the electrode when the electrodeposition is completed to obtain the low-platinum catalyst based on the transition-metal nitride nanoparticles, wherein the ultrathin atomic layer is composed of 1-5 atomic layers.

2. The low-platinum catalyst according to claim 1, wherein the transition metal nitride comprises one of Ti, V, Cr, Mn, Fe, Co, Ni, Cu, Nb, Mo or Ta, or the transition metal nitride comprises binary and ternary transition metal nitrides consisting of two or more of Ti, V, Cr, Mn, Fe, Co, Ni, Cu, Nb, Mo or Ta.

3. The low-platinum catalyst according to claim 1, wherein a specific preparation process of the transition-metal ammonia complex of the step (1) is as follows: adding a transition metal precursor into a beaker containing the non-aqueous solvent, transferring into a Meng washing bottle after dissolving of the transition metal precursor is completed, introducing ammonia gas for complexation, with a gas flow of ammonia gas being controlled as 30-100 ml/min, and an introducing time of 0.5-1 hour; transferring an obtained mixture containing a complex into a crucible, vacuum drying in the oven at 50-90° C. for 8-24 hours to obtain the transition-metal ammonia complex; wherein the transition metal precursor comprises one or two or three of titanium tetrachloride, tetrabutyl titanate, cobaltous acetate, ferric nitrate, copper chloride, chromium acetate, manganese chloride, niobium chloride, molybdenum chloride or tantalum chloride; and a concentration range of the transition metal precursor in a reaction system solution is 0.1-3 mg/mL.

4. The low-platinum catalyst according to claim 3, wherein the transition metal nitride comprises one of Ti, V, Cr, Mn, Fe, Co, Ni Cu, Nb, Mo or Ta, or the transition metal nitride comprises binary and ternary transition metal nitrides consisting of two or more of Ti, V, Cr, Mn, Fe, Co, Ni, Cu, Nb, Mo or Ta.

5. The low-platinum catalyst according to claim 1, wherein in the step (3), the active metal comprises one or more of Pt, Au, Pd, Ru and Ir; a salt of the active metal comprises one or more of tetraammineplatinum chloride monohydrate, chloroplatinic acid, chloroauric acid, palladium dichloride, ruthenium trichloride and iridous chloride; the complexing agent comprises citric acid, EDTA or polyvinylpyrrolidone; the conductive aid is sodium sulfate or potassium sulfate; and a concentration of a component of the active metal in the electrodepositing solution is 5-100 mM.

6. The low-platinum catalyst according to claim 5, wherein the transition metal nitride comprises one of Ti, V, Cr, Mn, Fe, Co, Ni, Cu, Nb, Mo or Ta, or the transition metal nitride comprises binary and ternary transition metal nitrides consisting of two or more of Ti, V, Cr, Mn, Fe, Co, Ni, Cu, Nb, Mo or Ta.

7. The low-platinum catalyst according to claim 1, wherein a way of deposition of the active metal adopted in the step (3) is the pulse electrodeposition, the pulse frequency is 100-10000 s$^{-1}$, each pulse contains a turn-on time and a turn-off time, the turn-on time ($t_{on}$) is 0.00003 s to 0.001 s, the turn-off time ($t_{off}$) is 0.00015-0.01 s, a ratio of the turn-on time to the turn-off time ($t_{on}/t_{off}$) varies depending on a molar concentration of the active metal in an electrolyte and the loading amount of the active metal required, with a value between 0.1 and 100; and a total pulse number is 500-20000.

8. The low-platinum catalyst according to claim 7, wherein the transition metal nitride comprises one of Ti, V, Cr, Mn, Fe, Co, Ni, Cu, Nb, Mo or Ta, or the transition metal nitride comprises binary and ternary transition metal nitrides consisting of two or more of Ti, V, Cr, Mn, Fe, Co, Ni, Cu, Nb, Mo or Ta.

9. The low-platinum catalyst according to claim 1, wherein a pulse current density of the pulse electrodeposition in the step (3) is 1-50 mA/cm$^2$.

10. The low-platinum catalyst according to claim 9, wherein the transition metal nitride comprises one of Ti, V, Cr, Mn, Fe, Co, Ni, Cu, Nb, Mo or Ta, or the transition metal nitride comprises binary and ternary transition metal nitrides consisting of two or more of Ti, V, Cr, Mn, Fe, Co, Ni, Cu, Nb, Mo or Ta.

11. The low-platinum catalyst according to claim 1, wherein the non-aqueous solvent comprises an ethanol solution or an isopropanol solution.

12. The low-platinum catalyst according to claim 11, wherein the transition metal nitride comprises one of Ti, V, Cr, Mn, Fe, Co, Ni, Cu, Nb, Mo or Ta, or the transition metal nitride comprises binary and ternary transition metal nitrides consisting of two or more of Ti, V, Cr, Mn, Fe, Co, Ni, Cu, Nb, Mo or Ta.

* * * * *